United States Patent [19]

Kompa et al.

[11] 4,344,705

[45] Aug. 17, 1982

[54] DISTANCE MEASURING APPARATUS BASED ON THE PULSE TRAVEL TIME METHOD

[75] Inventors: Günter Kompa, Schopfheim; Don J. R. Stock, Schopfheim-Langenau, both of Fed. Rep. of Germany

[73] Assignee: Endress u. Hauser GmbH u. Co., Maulburg, Fed. Rep. of Germany

[21] Appl. No.: 128,174

[22] Filed: Mar. 7, 1980

[30] Foreign Application Priority Data

Mar. 7, 1981 [DE] Fed. Rep. of Germany ....... 2908854

[51] Int. Cl.$^3$ .......................... G01C 3/08; G01S 13/10
[52] U.S. Cl. ........................ 356/5; 307/246; 343/13 R; 372/81
[58] Field of Search ................ 307/246; 331/94.5 PE; 356/5; 343/13 R

[56] References Cited

U.S. PATENT DOCUMENTS

| | | | |
|---|---|---|---|
| 3,305,862 | 2/1967 | Samuel et al. | 343/13 R |
| 3,601,488 | 8/1971 | Ripart | 356/5 |
| 3,723,002 | 3/1973 | Everest et al. | 356/5 |
| 3,900,261 | 8/1975 | Wingate | 356/5 |
| 3,951,549 | 4/1976 | Fowler et al. | 356/5 |
| 4,125,835 | 11/1978 | Barry | 356/5 |

FOREIGN PATENT DOCUMENTS 2544842 4/1977 Fed. Rep. of Germany .

*Primary Examiner*—S. C. Buczinski

*Attorney, Agent, or Firm*—Gerald J. Ferguson, Jr.; Joseph J. Baker

[57] ABSTRACT

Distance measuring apparatus based on the pulse travel time method comprising a light pulse generator for generating periodic light pulses, a transmitting optical system for transmitting the light pulses, a receiving optical system for receiving the echo pulses produced by reflection of the light pulses at a target object, a photoelectric transducer for converting each echo pulse to an electrical measuring pulse, means for generating electrical reference pulses in predetermined time relationship to the transmitted light pulses, a time transformation stage operating by the sampling method and comprising a sampling pulse generator for generating periodic sampling pulses whose period is slightly different to the period of the transmitted light pulses, a first sampling circuit receiving the sampling pulses and the reference pulses and producing time-transformed reference pulses by periodically sampling a large number of successive reference pulses by means of the sampling pulses, and a second sampling circuit receiving the sampling pulses and the measuring pulses and producing time-transformed measuring pulses by periodically sampling a large number of successive measuring pulses by means of the sampling pulses, the second sampling circuit being directly connected to the output of the photoelectric transducer to receive the measuring pulses without intervening amplification, and time measuring means for measuring the time interval between corresponding edges of each time-transformed reference pulse and an associated time-transformed measuring pulse.

20 Claims, 15 Drawing Figures

DISTANCE MEASURING APPARATUS BASED ON THE PULSE TRAVEL TIME METHOD

The invention relates to a distance measuring apparatus based on the pulse travel time method comprising a light pulse generator for generating periodic light pulses, a transmitting optical system for transmitting the light pulses, a receiving optical system for receiving the echo impulses produced by reflection of the light pulses at a target object, a photoelectric transducer for converting the echo pulses to an electrical measuring pulse and a time measuring means for measuring the time interval between corresponding edges of each measuring pulse and of an electrical reference pulse in predetermined time relationship to the transmission light pulse associated therewith.

A distance measuring apparatus or range meter of this type is known for example from the journal "Optik", 44 (1976) No. 2, pages 217 to 222. A major problem is that with the relatively small distances for which such appliances can be used the time intervals to be measured are very small. It is therefore difficult to obtain adequate measuring accuracy and a practicable resolution power with acceptable expenditure. Furthermore, fairly short pulses with steep edges must be processed and this requires circuits of large band width. Since the echo pulses received are very weakened amplification must be carried out on the receiving side with high gain. The multistage amplifiers necessary for this purpose are very complicated if their band width is so large that the measuring pulses are amplified without flattening of the pulse edges. If however cheaper integrated amplifiers of small band width are used the pulse edges are obliterated, impairing the measuring accuracy.

Furthermore, the wide-band high-gain amplifiers also amplify all the noise and interference signals in the same manner, resulting in the danger of measuring errors due to false triggerings.

If the time measurement is by counting clock pulses during the measuring time, as is usually the case, the resolution power is defined by the time interval between two successive clock pulses, i.e. the clock pulse frequency. Here as well, the expenditure depends on the frequency limit of the pulse generators and pulse counters employed.

To avoid expensive counting means with relatively high counting pulse frequencies it is known from the aforementioned publication to provide an analog time magnification with a factor of for example 100 and to count subsequently digitally with a lower clock frequency. An analog time magnification is obtained in that a gate pulse derived from the reference pulse and measuring pulse switches a constant current source with the true measuring time and this source charges a storage capacitor. After termination of the gate pulse the storage capacitor is discharged by a likewise constant but substantially smaller current.

The magnification of the gate time depends on the ratio of the charging current to the discharging current. Although this permits lower counting pulse frequencies to be used the system accuracy is not improved because firstly a gate pulse must be formed with the true measuring time and all the aforementioned error causes are incorporated into said pulse. Above all, the problem of wide-band amplification of the echo signals received remains. Furthermore, the measuring accuracy is impaired by the temperature dependence of the circuit elements used for the time magnification.

The problem underlying the invention is to provide a range measuring apparatus of the type mentioned at the beginning which with low circuit expenditure has an extremely high distance resolution with high measuring accuracy, high reliability and large range.

According to the invention this problem is solved in that both the reference pulses and the measuring pulses are supplied to a time transformation stage which operates by the sampling method and in which by sampling a large number of successive pulses by means of periodic sampling pulses whose period is slightly different to the period of the light pulses time-transformed pulses are generated, and that the time measuring means measures the time interval between corresponding edges of the time-transformed pulses.

The sampling method employed in particular with sampling oscillographs permits of course a very high time magnification of periodically recurring processes. At the output of the time transformation stage time-transformed signals are obtained which have the same time variation as the original signals but on a time scale magnified by the time transformation factor. The time transformation factor may be very large, for example of the order of magnitude of $10^6$ or more. Since the time interval to be measured is also magnified by this time transformation factor, the time measurement can be made very accurately with relatively low counting pulse frequency and high resolving power. A particular advantage results from the possibility of conducting the time transformation directly on the output signals of the photoelectric transducer without previous amplification and then conducting the necessary amplification afterwards. The time-transformed measuring pulses are thus an exact image of the echo pulses received, with however the band width reduced by the ratio of the time transformation factor. Thus, distortion-free amplification can be achieved with economical amplifiers of low band width.

Advantageous embodiments and further developments of the invention are characterized in the subsidiary claims.

The invention will be explained with reference to an example of embodiment illustrated in the drawings, wherein.

Figure 1:
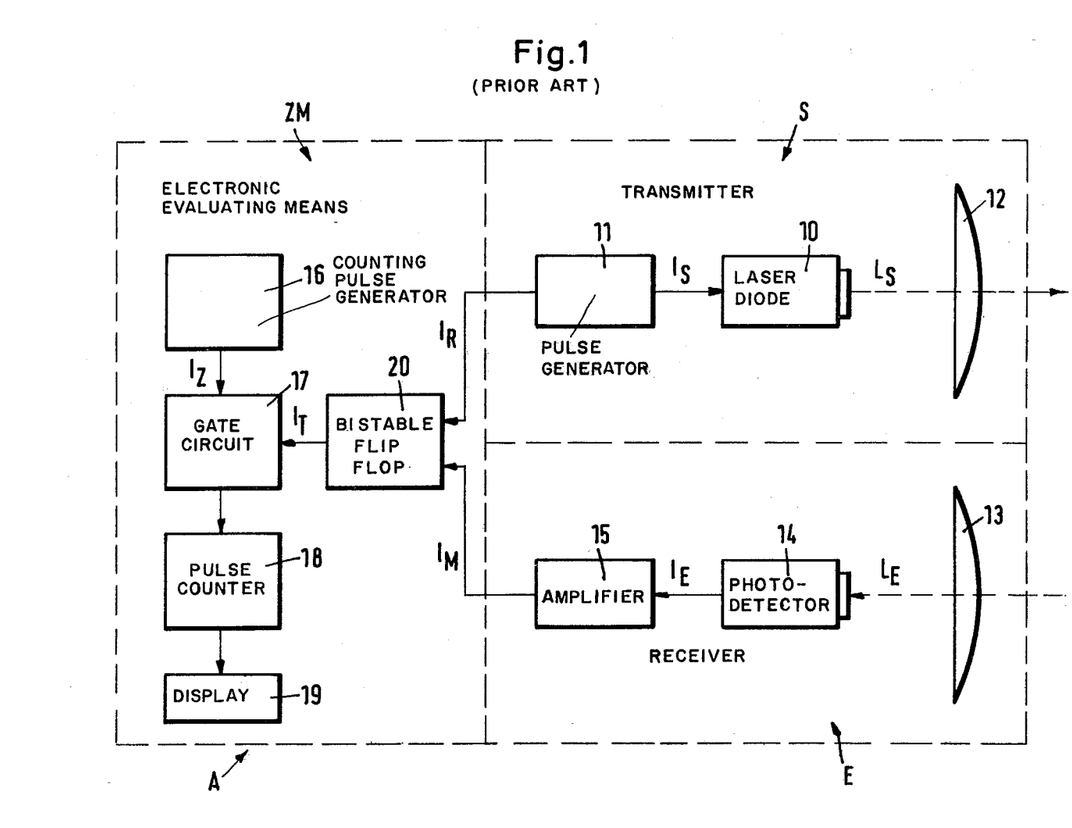
FIG. 1 is a block diagram of a range measuring apparatus known in the art and operating with light pulses.

FIG. 1 shows the construction of a laser range meter of the prior art. It consists of a transmitter S, a receiver E and an electronic evaluating means A. The transmitter S comprises a laser diode which is driven by pulses $I_S$ from a pulse generator 11. The laser diode 10 produces for each electrical pulse a light pulse $L_S$ which is collimated by a transmission optical system 12 and directed in the form of a parallel or slightly divergent light beam towards the object whose range is to be measured. The echo light pulse $L_E$ reflected from the object and greatly weakened passes via a focusing receiving optical system 13 included in the receiver E to the photosensitive surface of a photodetector 14 which generates an electrical pulse $I_E$ for each echo light pulse $L_E$. The electrical pulses $I_E$ supplied by the photo detector 14 are amplified with the aid of a wide band amplifier 15 and supplied to the electronic evaluating means A as measuring pulses $I_M$.

The time between the instant of transmitting a transmission light pulse $L_S$ and the instant of arrival of a received light pulse $L_E$ produced by reflection of said transmission light pulse at the target object is obviously equal to twice the travel time of the light between the range measuring apparatus and the object measured and is thus a measure of the distance between the apparatus and the object. Since the electrical pulses $I_R$, $I_S$ and $I_M$, $I_E$ respectively are in a constant and exactly known time relationship with the light pulses $L_S$ and $L_E$ respectively, the time between the electrical pulses $I_S$ and $I_E$ or between the electrical pulses $I_R$ and $I_M$ is obviously an indication of the distance to be measured.

The electronic evaluating means A therefore includes a time measuring means ZM for measuring the time interval between the two electrical pulses $I_S$ and $I_E$. The time measuring means ZM comprises in the apparatus illustrated a counting pulse generator 16 which emits counting pulses $I_Z$ with a constant exactly known recurrence frequency $f_Z$. The counting pulses $I_Z$ furnished by the counting pulse generator 16 are supplied by a gate circuit 17 to a pulse counter 18 whose count can be indicated with the aid of a display means 19. The control input of gate circuit 17 is connected to the output of a bistable flip-flop 20 which receives at the set input a reference pulse $I_R$ originating from the pulse generator 11 and synchronous with the transmission electrical pulse $I_S$ and at the reset input the measuring pulse $I_M$ furnished by the wide-band amplifier 15. The bistable flip-flop 20 is so constructed that it is set by the leading edge of each reference pulse $I_R$ and reset by the leading edge of each measuring pulse $I_M$. It therefore furnishes at the output a gate pulse $I_T$ whose duration is equal to the time interval between the pulses $I_R$ and $I_M$. The gate circuit 17 is open for the duration of the gate pulse $I_T$ and the counting pulses $I_Z$ allowed to pass during the open time are counted in the pulse counter 18. The number of pulses counted is indicated by the display means 19 and proportional to the distance to be measured.

The same operation is repeated periodically with the period of the transmission light pulses $I_S$ which of course must be made so large that with the maximum range to be measured the echo pulse $L_E$ has arrived before the next transmission light pulse has been emitted. In practice, with laser range measuring apparatuses of the type shown in FIG. 1 a very low recurrence frequency is used, for example 300 Hz. The display means 19 continuously displays the distance of the object measured in real time.

The resolving power of this distance measuring apparatus, i.e. the smallest range difference which can be measured, depends on the time interval between two counting pulses $I_Z$. This interval cannot be made as small as may be desired because the counting pulse frequency $f_Z$ has an upper limit. Denoting the speed of light as c and the counting pulse frequency as $f_Z$ the accuracy of the distance measurement is $$\pm \Delta R = \frac{c}{2f_Z}.$$

The counting pulse frequency is generally 30 MHz and the resulting range resolving power is 5 m.

The measuring accuracy is also limited by the band width of the circuits, which must process steep pulses with large band width. Thus, high-power light pulses with rise times in the nano or pico second range may be generated on the basis of electrical pulses whose rise time must be smaller than the life of the electrons in the laser diode. On the receiver side, the echo pulses, which are generally greatly weakened due to extreme energy losses in diffuse reflection at the objects measured, must be greatly amplified and consequently several amplifier stages must be employed. For the distortion-free transmission of a pulse edge with a rise time of 1 ns a band width as high as 350 MHz is necessary. Amplifiers having this band width are presently not available as economic integrated components. For this reason, integrated components having a band width of about 120 MHz are employed. This limits the frequency spectrum of the transmitted and amplified pulses and as a result the pulse flanks are flattened and the rise time thus increased.

Furthermore, because of the nevertheless very large band width of the amplifier 15 noise pulses received are amplified in the same manner as the echo pulses and the danger results of the electronic evaluating means responding to noise pulses. Finally, the inherent noise of the amplifier 15 reduces the sensitivity of the system.

These phenomena result in the system-inherent error of the time determination increasing. The standard deviation in a time measuring operation is $$\delta t = \frac{\text{rise time}}{\text{signal/noise ratio}}$$

i.e. it is proportional to the rise time and inversely proportional to the signal/noise ratio.

Figure 2:
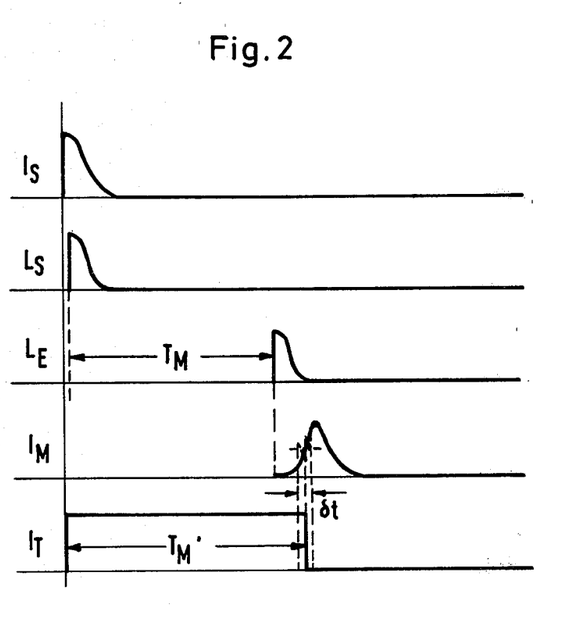
FIG. 2 shows time diagrams of pulses occurring with the range measuring apparatus of FIG. 1.

The time relationships in the distance measurement are indicated in the pulse diagram in FIG. 2. The latter shows the electrical transmission pulse $I_S$ which by employing the avalanche breakdown in transistors can be produced with very steep leading edge. If the rise time of the pulse edge is within the life of the electrons in the active zone of the laser diode 10 the transmission light pulse $L_S$ also has a very steep leading edge which trails the leading edge of the electrical pulse $I_S$ with a very small exactly known delay. After passage of the measured distance the received light pulse $L_E$ reaches the photo detector 14. The interval between the leading edges of the light pulses $L_S$ and $L_E$ forms the true measuring time $T_M$ which is proportional to the distance to be measured. After amplification of the electrical pulse $I_E$ furnished by the photo detector 14 in the amplifier 15 of limited band width a measuring pulse $I_M$ with flattened leading edge is obtained at the output of said amplifier. Since the flip-flop 20 does not respond until a predetermined threshold value is reached, the gate pulse $I_T$ has a duration $T_{M'}$ which is greater than the true measuring time $T_M$. The time differences between the leading edges of the electrical pulses and of the light pulses are also incorporated into the gate time $T_{M'}$. Since these time distances are consant and exactly known they can be taken into account in the time measurement and consequently do not affect the measuring accuracy. The same applies to the increase of the gate time $T_{M'}$ produced by the flattening of the leading edge of the measuring pulse $I_M$, which can also be taken into account when evaluating the time measurement.

On the other hand, a source of innaccuracy in the measurement is the flattening of the leading edge in conjunction with the superimposed noise due to the low level of the received signals and the necessary wide-band amplification. FIG. 2 indicates the superimposed noise at the leading edge of the measuring pulse $I_M$. As a result, the threshold value may be exceeded by the sum of useful signal and interference signal sooner or later than by the useful signal alone; this results in an uncertainty range δt in the time measurement which is obviously the greater the flatter the leading edge of the measuring pulse and the greater the noise signal with respect to the useful signal.

Figure 3:
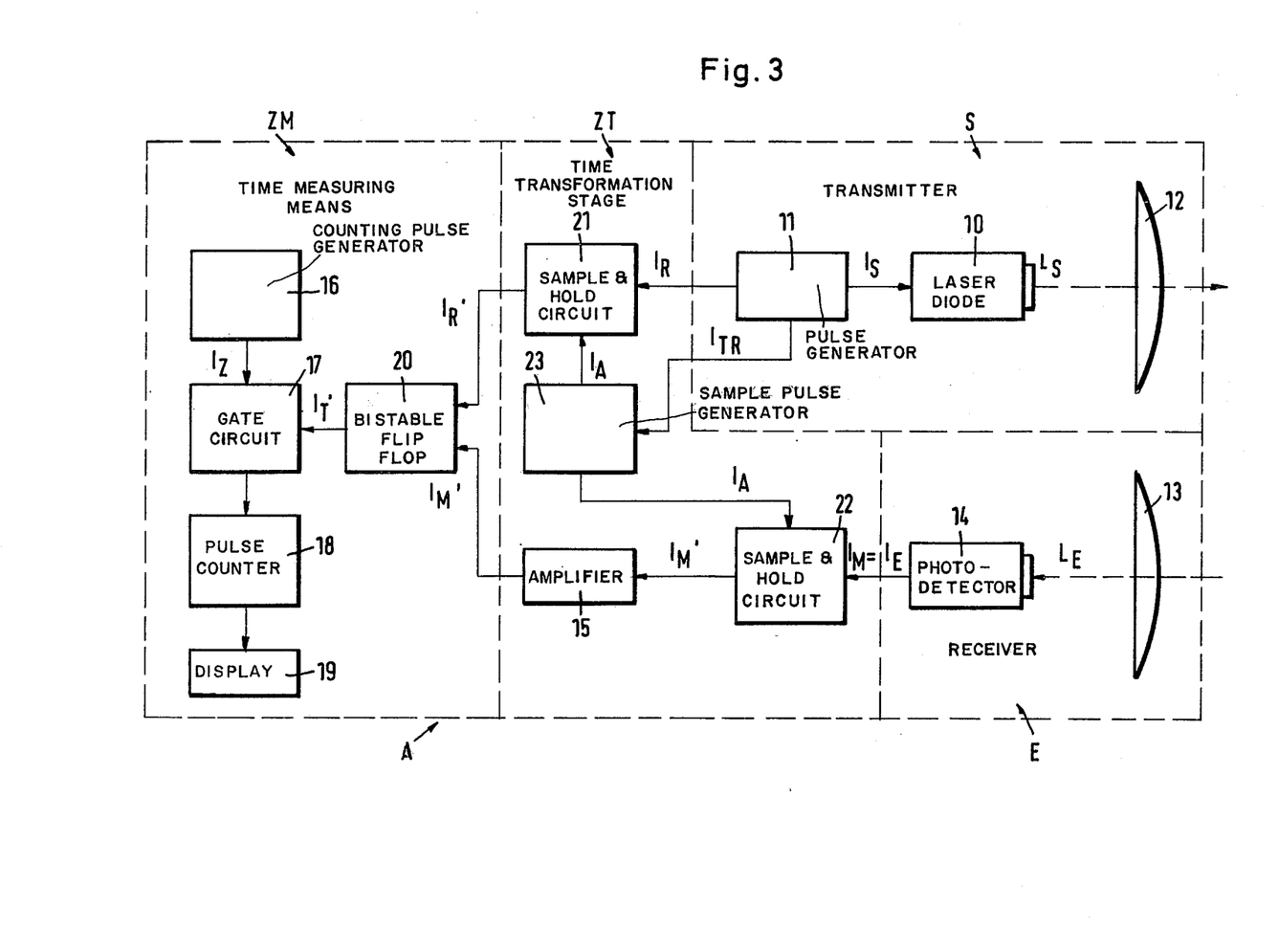
FIG. 3 is a block diagram of a range measuring apparatus according to the invention.

FIG. 3 shows a laser range measurement apparatus which has an improved range resolution with higher freedom from interference and consequently permits greater ranges.

The distance measuring apparatus of FIG. 3 again includes almost all the components of that of FIG. 1 and these are also denoted by the same reference numerals. However, an essential difference is that the electronic evaluating means A includes in addition to the time measuring means ZM a time transformation stage ZT which receives the references pulses $I_R$ and the measuring pulses $I_M$, samples the latter by the well-known sampling method and furnishes at the output time-transformed reference pulses $I_{R'}$ and time-transformed measuring pulses $I_{M'}$ which are applied instead of the original pulses $I_R$ and $I_M$ respectively to the bistable flip-flop which furnishes a corresponding time-transformed gate pulse $I_T$. The time measuring means ZM thus measures the time interval between the time-transformed pulses $I_{R'}$ and $I_{M'}$. This interval, like the pulses themselves, is magnified in accordance with the time transformation factor of the sampling method.

As is known, the sampling method resides in extracting from each of the periodically successive pulses a sample value, the time location of the sample values being slightly displaced from pulses to pulse with respect to the pulse period. Said sampling is controlled by sampling pulses whose period is greater than the period of the pulses to be sampled by a fixed very small time difference. Each sample value is stored until the next sampling. The successive sample values thus give an image of the sampled pulses but on a time scale magnified by the time transformation factor.

To carry out this method the time transformation stage ZT includes two storing sample circuits 21, 22, for example of the known "sample and hold" circuit type (instantaneous value stores) and a sample pulse generator 23 which furnishes the sample pulses $I_A$ controlling the sampling. The sampling circuit 21 receives the reference pulses $I_R$ from the pulse generator 11 and furnishes the time-transformed reference pulses $I_{R'}$. The sampling circuit 22 receives the measuring pulses $I_M$ and furnishes the time-transformed pulses $I_{M'}$. The sampling pulse generator 23 is synchronized by trigger pulses $I_{TR}$ which are supplied by the pulse generator 11 and which have the same period as the reference pulses $I_R$.

A further special feature of the distance or range measuring apparatus of FIG. 3 resides in that the electrical pulses $I_E$ furnished by the photo detector 14 are not amplified in a wide-band amplifier but subjected directly to sampling as measuring pulses $I_M$. The time-transformed pulses $I_{M'}$ are therefore an image of the undistorted electrical pulses $I_E$.

Figure 4:
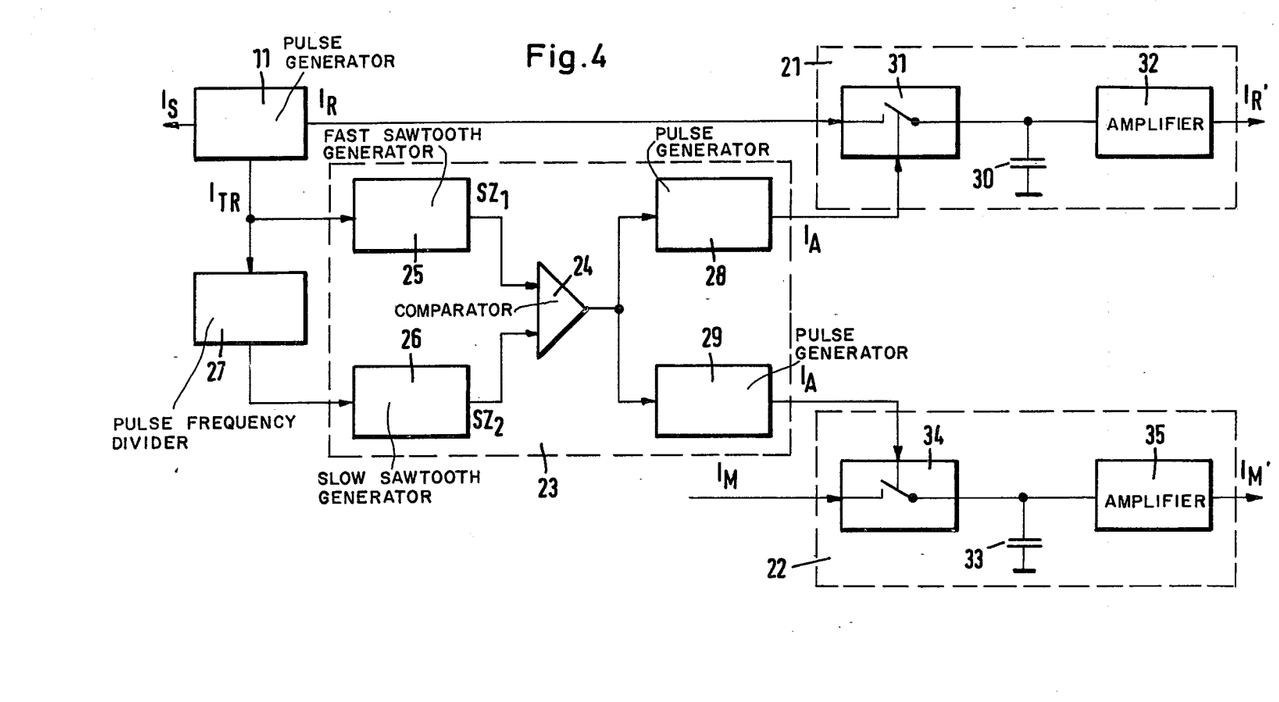
FIG. 4 is a block circuit diagram of the time transformation stage of the range measuring apparatus of FIG. 3.

The amplifier 15 follows the sampling circuit 22 and need only amplify the time-transferred measuring pulses $I_{M'}$. A small band width is adequate for undistorted amplification of these time-transformed measuring pulses $I_{M'}$. The rise steepness, with respect to the magnified time scale, is thus retained. On the other hand, due to the narrow band amplification the signal/noise ratio is considerably improved. Both factors cooperate to reduce the measuring inaccuracy outlined above. FIG. 4 shows the circuit diagram of the time-transformation stage ZT in greater detail. The function of this circuit will be explained with the aid of the time diagrams of FIG. 5.

The sampling pulse generator 23 includes a comparator 24, one input of which is connected to the output of a fast sawtooth generator 25 and the other input of which is connected to the output of a slow sawtooth generator 26. The fast sawtooth generator 25 is synchronized by the trigger pulses $I_{TR}$ so that the period of the sawtooth signal $SZ_1$ is equal to the period of the reference pulses $I_R$ and thus also equal to the period of the measuring pulses $I_M$. The slow sawtooth generator 26 is synchronized by the output pulses of a pulse frequency divider 27 which receives at the input the trigger pulses $I_{TR}$ and the division factor of which is dimensioned in dependence upon the time transformation factor so that the period of the slow sawtooth signal $SZ_2$ is equal to the duration of a complete sampling cycle. The rise steepness of the sawtooth signals $SZ_1$ and $SZ_2$ is of course different so that each sawtooth has reached a predetermined amplitude at the end of its period.

The sawtooth generators 25 and 26 can generate linearly rising sawtooth signals; however, they are preferably constructed according to the principle disclosed in DE-OS 2,729,331 so that they can produce exponentially rising sawtooth voltages. Each sawtooth generator can then be a simple RC circuit including a capacitor which is charged via a charging resistance by a DC voltage source and periodically discharged by a switch actuated by the synchronization signal. The rise steepness of the sawtooth signals depends in this case on the time constant of the RC circuits which must be dimensioned differently accordingly for the two sawtooth generators 25, 26.

In each case the comparator 24 compares the two sawtooth voltages $SZ_1$ and $SZ_2$ and emits a signal whenever the voltages compared are of equal magnitude. Each output signal of the comparator 24 triggers two pulse generator stages 28, 29, each of which then produces a short sampling pulse $I_A$. The sampling pulses $I_A$ of the pulse generator stage 28 control the sampling circuit 21 and the sampling pulses $I_A$ of the pulse generator stage 29 control the sampling circuit 22.

The sampling circuit 21 includes, in the manner of the well-known sample and hold circuits, a storage capacitor 30 which is connected via an electronic switch 31 controlled by the sampling pulses $I_A$ to a line carrying the reference pulses $I_R$. The switch 31 is normally open and is briefly closed for the duration of each sampling pulse $I_A$ so that the storage capacitor 30 then assumes a charging voltage which corresponds to the instantaneous value of the reference pulse. An amplifier 32 amplifies the voltage present at the storage capacitor 30. Said amplifier also serves as separating stage which prevents discharge of the capacitor via the output circuit so that the stored voltage is substantially retained between two successive samplings. Furthermore, due to its small band width the amplifier 32 suppresses all the noise signals and signal components of higher frequency.

In the same manner the sampling circuit 22 includes a storage capacitor 33, an electronic switch 34 and an amplifier 35.

Figure 5:
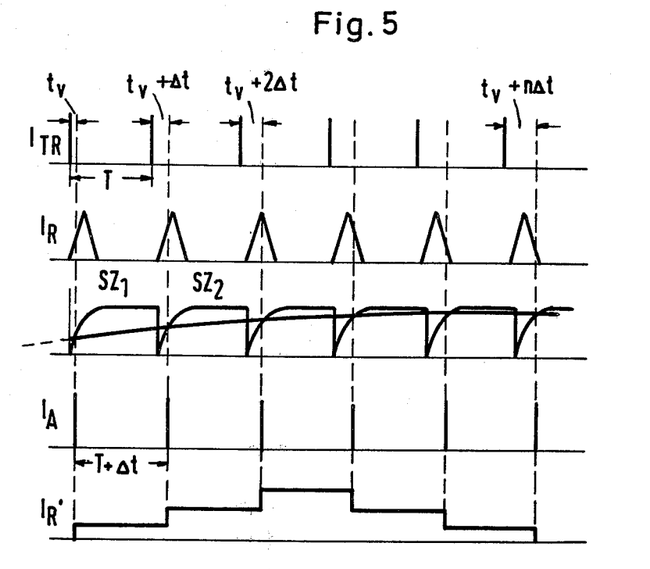
FIG. 5 shows time diagrams explaining the function of the time transformation stage of FIG. 4.

FIG. 5 shows in the upper line the trigger pulses $I_{TR'}$ which on the one hand in the pulse generator trigger the production of the transmission pulses $I_S$ and the reference pulses $I_R$ and on the other hand serve to synchronize the sampling pulse generator 23. Each trigger pulse triggers in the fast sawtooth generator 25 the production of an exponentially rising edge of the sawtooth signal $SZ_1$. The comparator 25 compares the rising edges of the sawtooth signal $SZ_1$ with the very slowly exponentially rising edge of the sawtooth signal $SZ_2$ and when identity is detected triggers the production of a sampling pulse $I_A$. Due to the slow rise of the sawtooth signal $SZ_2$ the instants of the production of the sampling pulses are displaced from period to period by a small time interval $\Delta t$ with respect to the start of the period defined by a trigger pulse $I_{TR}$. Thus, if the trigger pulses $I_{TR}$ and thus also the transmission pulses $I_S$, the reference pulses $I_R$, the measuring pulses $I_M$ and the fast sawtooth signal $SZ_1$ have the period T, the sampling pulses $I_A$ have the period $T + \Delta t$. As proved in already mentioned DE-OS 2,729,331 this condition is fulfilled with exponential sawtooth signals exactly as with linear sawtooth signals.

The sampling pulses $I_A$ thus effect sampling of the reference pulses $I_R$ at instants which are displaced from period to period by the time interval $\Delta t$ with respect to the instant corresponding to the preceding sampling. The storge capacitor 30 thus assumes successive voltages which correspond to different instantaneous values of the reference pulses following each other at equal intervals. These sampling values therefore represent a simulation of the reference pulse in the form of stepped curve, the accuracy of which is the greater the greater the number of sampling values which are used for a complete sampling of the pulse curve, i.e. the smaller the time interval $\Delta t$. This number of the sampling values used defines at the same time the time transformation factor because with n sampling values the time-transformed pulse $I_R$, has a duration of n periods of the sampled pulses $I_R$. The time transformation factor is:

$$K_t = \frac{T + \Delta t}{\Delta t} \approx \frac{T}{\Delta t} = n.$$

FIG. 5 shows the time interval $\Delta t$ exaggerated for clarity. In a practical embodiment of the measuring apparatus described the recurrence frequency of the transmission pulses is 10 kHz; such high recurrence frequency is necessary since otherwise the sampling cycle is too long. The period t is in this case 100 $\mu s$. The time interval $\Delta t$ was made 66.7 ps to guarantee a range resolving power of 1 cm. This results in a time transformation factor of $$K_t = 1.5 \cdot 10^6.$$

This means that a time difference of 1 ns is represented over 1.5 ms. With a pulse rise time of about 500 ps in the true time range, after the time transformation a rise time of 0.75 ms results.

If a band width of at least 700 mHz is necessary for signal processing in the true time range, in the time-transformed range a band width of 1 kHz suffices.

An advantage of the laser range measuring apparatus described results from the fact that the two sampling channels for the reference pulses and the measuring pulses are made completely identically. Consequently, ambient influences, in particular temperature changes, act in the same manner on the two channels so that their effects cancel each other out in the result of the measurement.

The pulse generator stages 28 and 29 are preferably avalanche pulse generators in which the avalanche effect of transistors is utilized. Since the characteristics, in particular the temperature dependence, of such transistors operating generally outside the so-called certainty range are very different, as explained hereinafter with the aid of FIGS. 11 and 12 the avalanche pulse generators are made up largely as integrated hybrid circuits, transistors in the form of chips of a wafer having identical electrical properties being used.

It would also be possible to replace the two pulse generator stages 28 and 29 by a single stage whose output pulses are used to drive the two sampling circuits 21 and 22.

Figure 13:
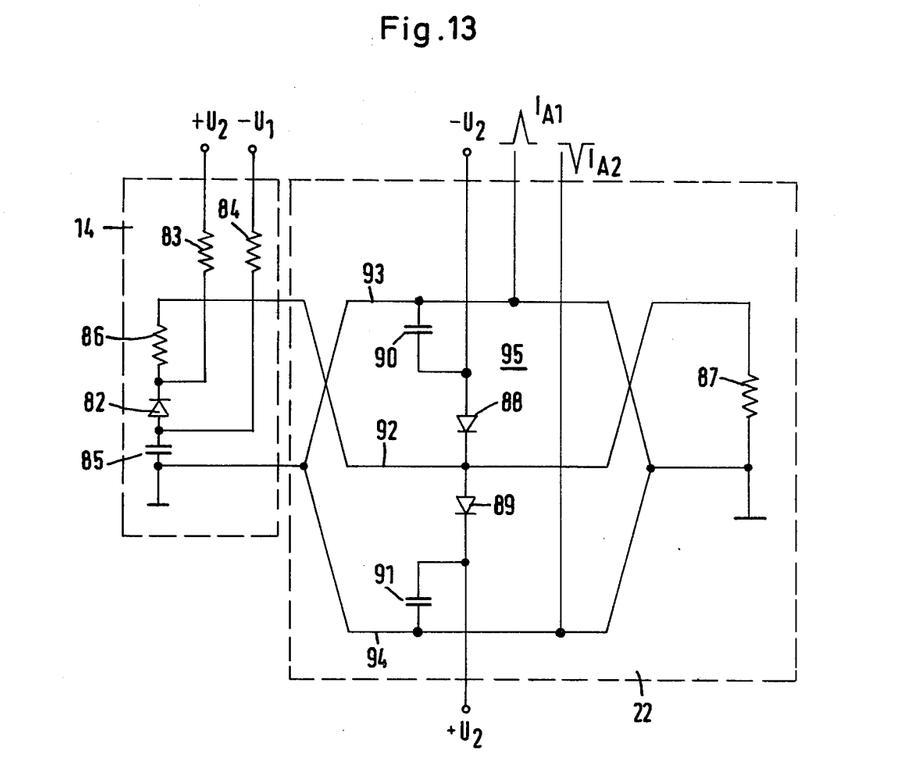
FIG. 13 is a circuit diagram of an embodiment of the photodetector and associated sampling circuit.
Figure 14:
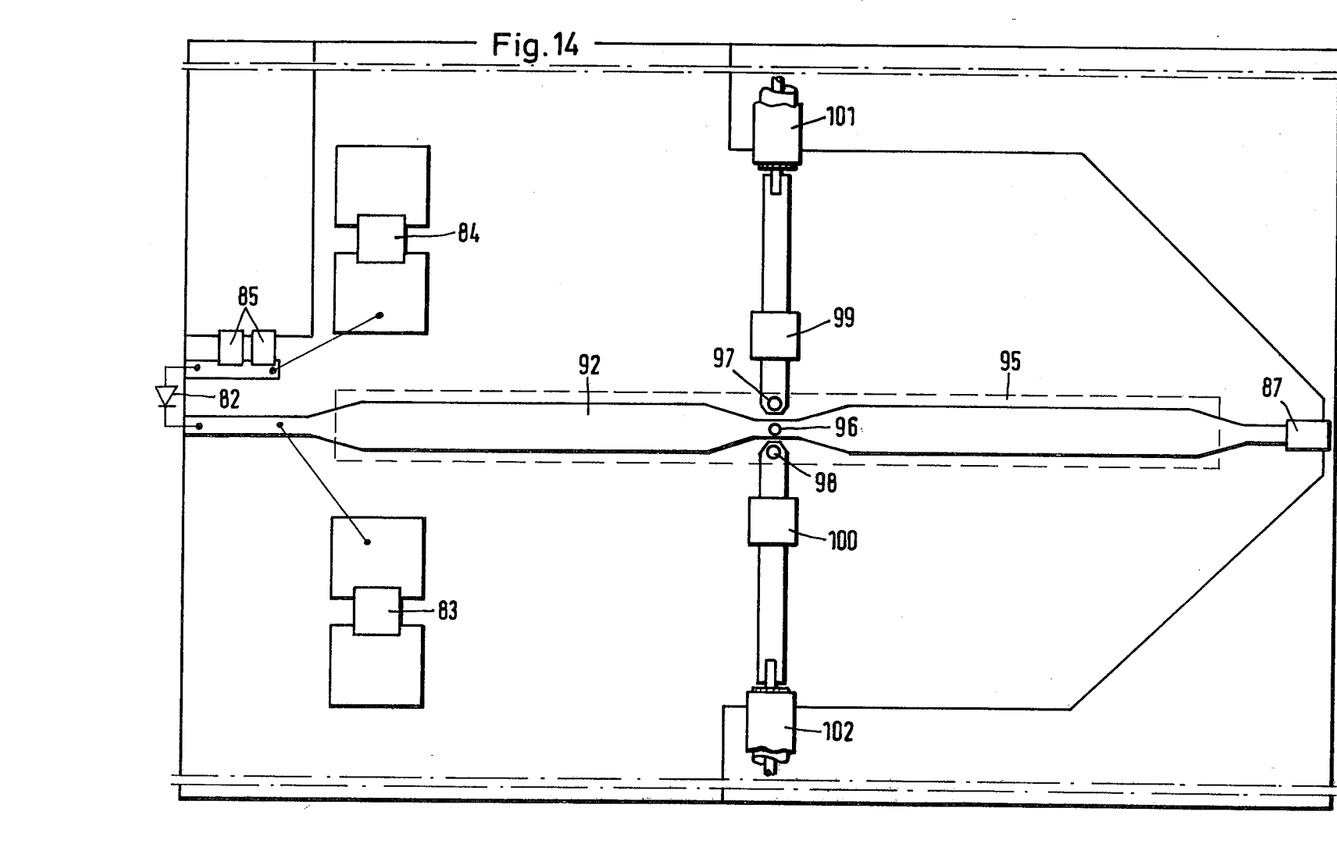
FIG. 14 shows the one side of a practical embodiment of the arrangement of FIG. 13 in the form of an integrated hybrid circuit and FIG 15 shows the other side of the integrated hybrid circuit of FIG. 14.
Figure 15:
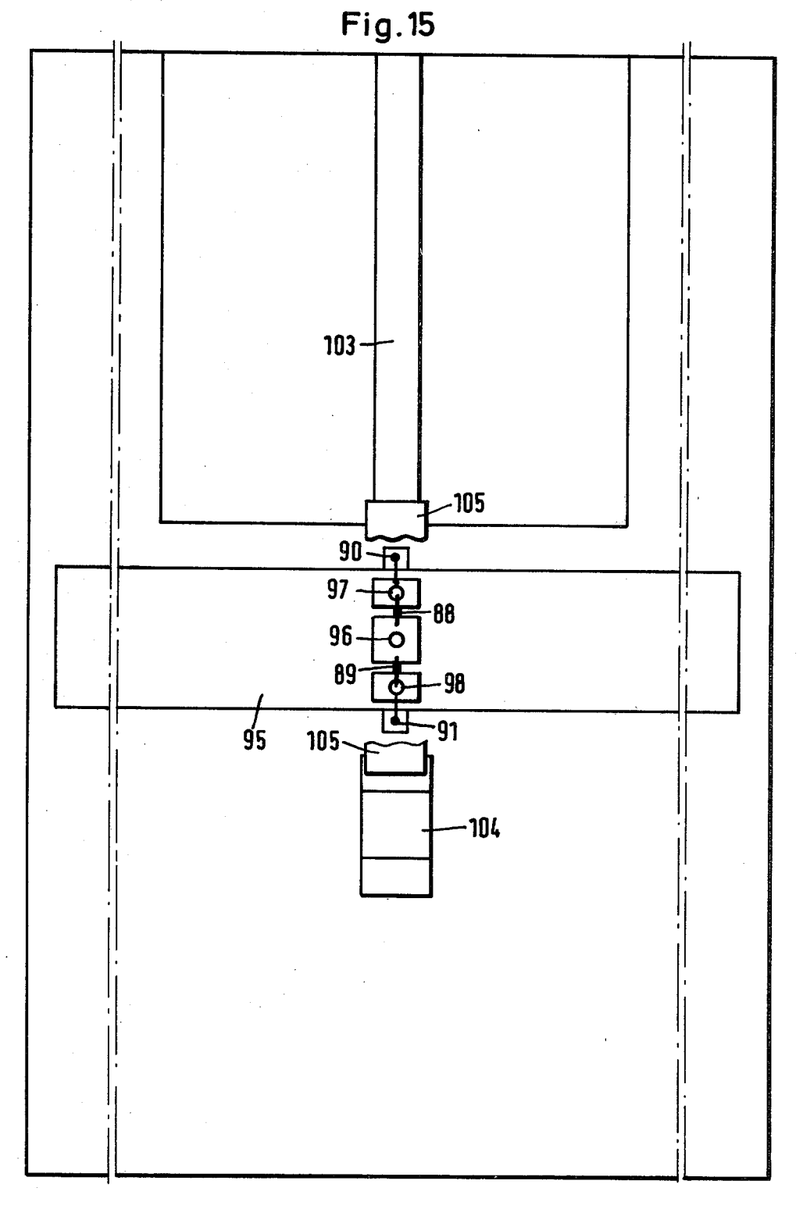

As explained hereinfter with reference to FIGS. 13 to 15, in a preferred embodiment the sampling circuits 21 and 22 are formed by sampling bridges which are also formed as integrated hybrid circuits. The push-pull sampling pulses required for such sampling bridges are obtained from the sampling pulses of one polarity furnished by the avalanche pulse generators with the aid of a short-circuited slit line. The pulse shaping produced by the slit line gives narrow pulses with very short rise time.

Figure 6:
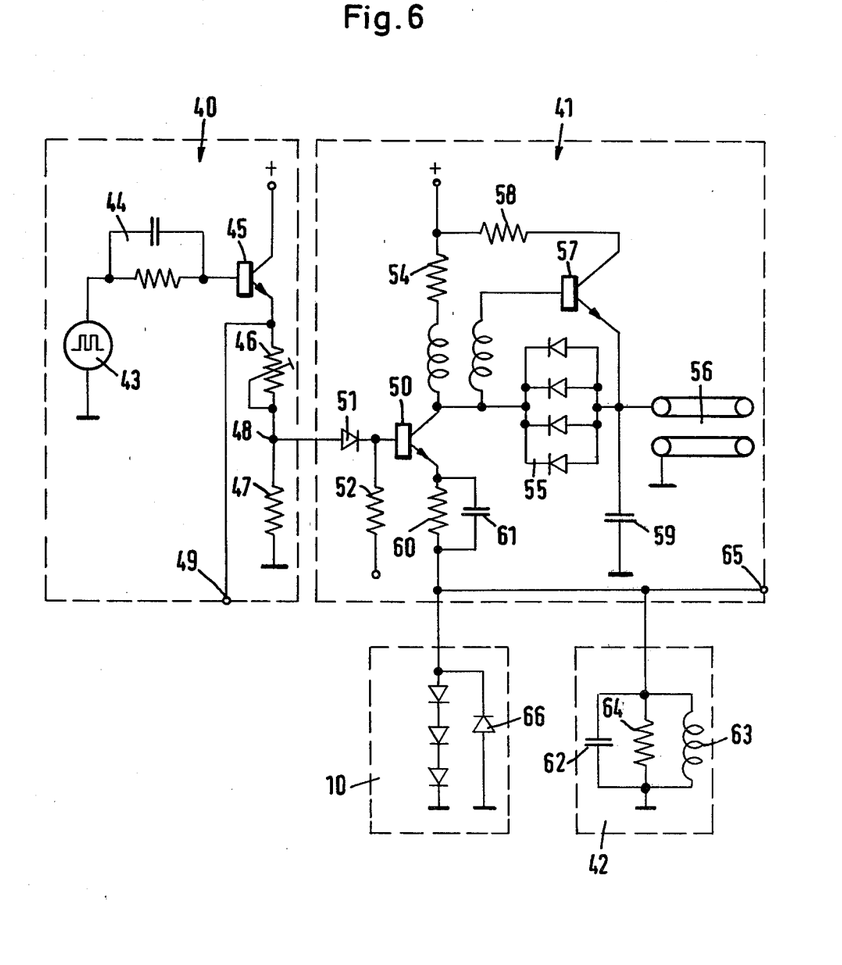
FIG. 6 is a circuit diagram of an embodiment of the pulse generator of the distance measuring apparatus of FIG. 3.

FIG. 6 shows the circuit diagram of an embodiment of the pulse generator 11. It comprises a trigger pulse generator 40, an avalanche pulse generator 41 and a pulse-shaping stage 42 for producing the reference pulses. Also shown is the semiconductor laser diode 10 formed as stack.

As already mentioned, to avoid a sampling cycle of excessive duration a relatively large recurrence frequency of the transmission pulses is employed. The recurrence frequency may be up to 100 kHz, and account must be taken of the maximum permissible duty cycle of the laser diodes In the previously mentioned practical example of embodiment the recurrence frequency is 10 kHz. The light pulses produced have generally a pulse width of $\leq 5$ ns. After each sampling cycle of duration $T_A$ the transmitter is brought into the rest condition for a time $T_R$ and then reactivated. The rest break also relieves the avalanche transistor.

Figure 7:
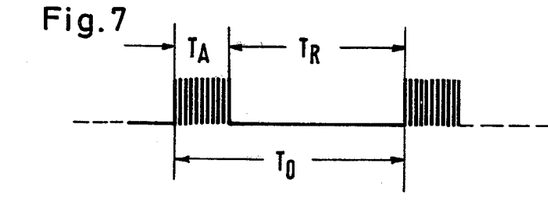
FIG. 7 is a time diagram of the light pulse train produced by the pulse generator of FIG. 6.

Correspondingly, the trigger pulse generator 40 includes a pulse generator stage 43 which is constructed for example employing the C-MOS technique and furnishes voltage pulses having an amplitude of $+12$ V according to to the time variation illustrated in FIG. 7. In a periodic cycle, in each period of duration $T_O$, corresponding to the period of the slow sawtooth voltage, during a time interval $T_A$ corresponding to the duration of a complete sampling cycle of the time transformation stage ZT a pulse train having the recurrence frequency 10 kHz is generated, followed by a rest break of duration $T_R$. The output of the pulse generator stage 43 is connected via an RC member 44 to the base of a transistor 45 connected as emitter follower, in the emitter circuit of which there is a voltage divider formed by a variable resistor 46 and a fixed resistor 47. The trigger pulses take from the tap 48 of the voltage divider serve to charge the avalanche pulse generator 41. The resistor 46 permits adjustment of the necessary trigger pulse amplitude. The trigger pulse tapped from the emitter of the transistor 45 are also available at a terminal 49 for synchronization of the sampling pulse generator 23. The emitter follower is of low resistance; the fixed resistor 47 has a resistance of 15 Ohms.

The avalanche pulse generator 41 includes an avalanche transistor 50 to the base of which the trigger pulses taken from the tap 48 are applied via a diode 51. The base is negatively biased via a resistor 52 to guarantee a high breakdown voltage.

The collector of the avalanche transistor 50 is connected on the one hand via a resistor 54 to the positive supply voltage terminal and on the other via a diode group 55 comprising a plurality of parallel switching diodes to the charging line 56. The charging of the charging line 56 is via a charging transistor 57 whose collector is connected via a low-value charging resistor 58 limiting the charging current to the positive supply voltage terminal. The base of the charging transistor 57 is connected to the collector of the avalanche transistor 50, the connecting line acting as inductance. A capacitor connected between the charging line 56 and ground serves to steepen the pulses and promotes switching of the avalanche transistor 50. The negative biasing of the base of the avalanche transistor 50 incidentally also obviates the danger of a breakdown via the low-value charging resistor 58, the charging resistor 57 and the switching diode group 55.

The charging line 56 is made as strip line which is coiled to save space. The polyester film or polyimide films as dielectric with thicknesses of 100 μm or less enable characteristic impedances of 2 Ohms or less to be obtained with strip widths of only about 6 mm.

The laser diode 10 in the form of a stack with parallel push-pull diode 66 is connected via a resistor 60 to the emitter of the avalanche transistor 50. The resistor 60 is approximately adapted to the characteristic impedance of the charging line 56. A capacitance 61 connected parallel to the resistor 60 permits additional electrical pulse shaping:

At the instant of switching through, the resistor 60 is capacitively bridged so that a higher voltage is across the laser diode 10 and this results in a greater pulse current.

Figure 8:
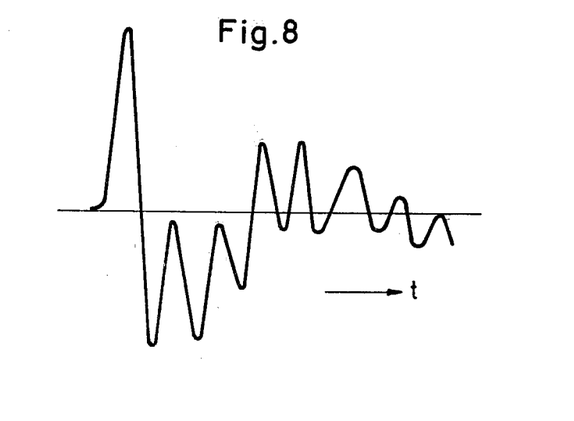
FIG. 8 is a time diagram of the reference pulse produced by the pulse generator of FIG. 6.

The pulse-shaping stage 42 is connected in parallel with the laser diode 10. It includes a parallel resonant circuit having a capacitance 62, an inductance 63 and a loss resistance 64 which is generaly formed by the characteristic impedance of the output coupling line. The reference pulses are available at the terminal 65 and have the time variation illustrated in FIG. 8. The overshoot is of no significance because for the time measurement only the leading edge is important. The reference pulses are very stable and consequently the start instant of the time measurement after the time transformation can be fixed with the aid of a simple and cheap threshold value detection.

Figure 9:
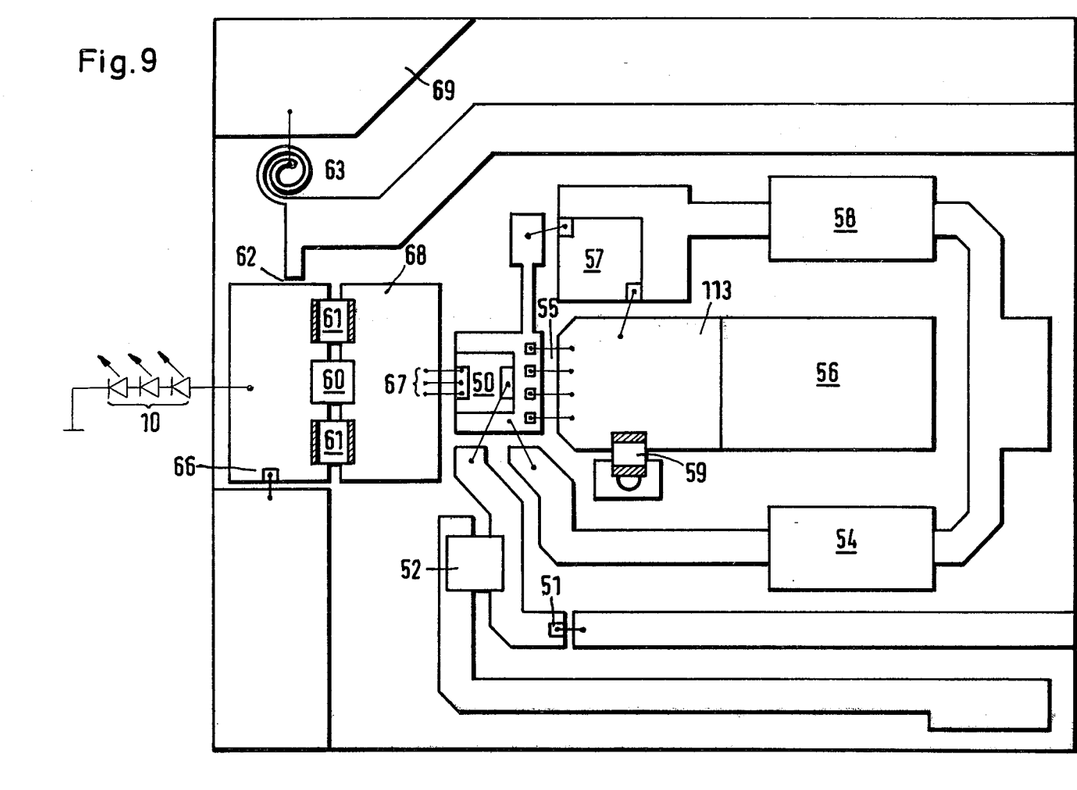
FIG. 9 is a practical embodiment of the avalanche generator contained in the pulse generator of FIG. 6 in the form of an integrated hybrid circuit.

FIG. 9 shows a practical embodiment of the avalanche pulse generator 41 of FIG. 6 in the form of an integrated hybrid circuit. The various components are designated by the same reference numerals as in FIG. 6.

Figure 10A:
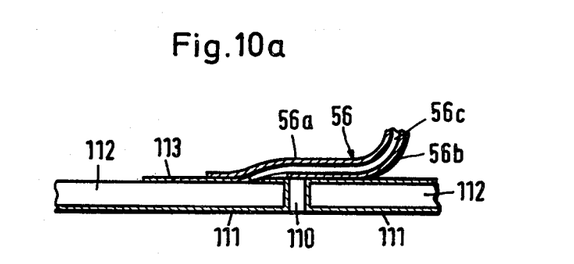
FIG. 10 shows various possibilities of attaching the charging line to the hybrid circuit of FIG. 9.
Figure 10B:
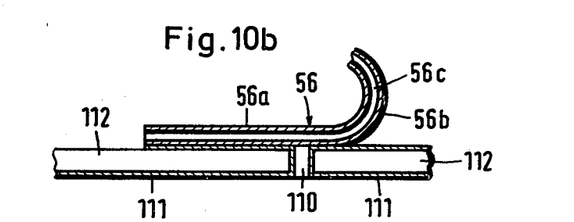

The practical embodiment illustrated has a space requirement of only $21 \times 25$ mm$^2$. The charging transistor 55 and the avalanche transistor 60 are in the form of a chip, substantially contributing to the compact structure. In particular, by the bond technique the line lengths in the discharging circuit can be kept extremely short. To reduce the inductance the emitter of the avalanche transistor 50 is connected by a plurality of bond wires 67 to the conductor piece 68. These wires could also be replaced by a wide metal strip providing the connection between the emitter and the conductor piece 68. Because of the planar structure parasitical inductive effects may be largely avoided. The pulse-shaping circuit 42 serving to produce the reference signal comprises the capacitance 62 formed by a slit and a spirally shaped narrow strip conductor as inductance 63 which is connected by a bond wire to the ground surface 69. FIG. 10 shows various possible solutions for the connection of the charging line 56 to the integrated circuit. The charging line 56 is formed as strip line with two strip conductors 56a, 56b and a dielectric 56c. In the two embodiments shown in FIGS. 10a and 10b the strip conductor 56b is connected by a metallized passage 110 to the ground plane 111 formed by the metallized lower surface of the substrate 112 of the integrated circuit illustrated in FIG. 9. In the embodiment of FIG. 10a the other strip conductor 56a is connected to a conductor piece 113 (FIG. 9). In the embodiment of FIG. 10b the contacting of the capacitor 59 as well as of the bond wires from the transistor 57 and the diode group 55 is directly on the strip conductor 56a of the charging line 56.

Figure 11:
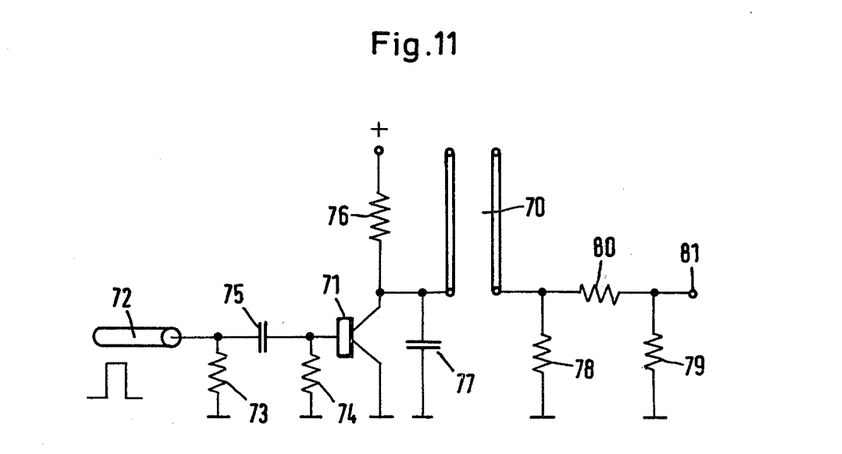
FIG. 11 is a circuit diagram of an embodiment of the pulse generating stage in the sampling pulse generator of the time transformation stage of FIG. 4.

FIG. 11 shows the circuit diagram of an valanche pulse generator having a balanced-to-ground charging line 70 and suitable in particular for the pulse generator stages 28, 29 of the sampling pulse generator 23. It includes an avalance transistor 71 whose base is connected to the input line 72 via an input network comprising two resistors 73, 74 and a capacitor 75. The collector of the avalanche trasnsitor 71 is connected to the one conductor of the charging line 70 and via a resistor 76 to the positive supply voltage terminal. A capacitor 77 connected between the connector and ground serves to steepen the pulses. The other conductor of the line 70 is connected via a resistance network comprising three resistors 78, 79, 80 to the output terminal 81. All the lines have a characteristic impedance of 50 Ohms. The resistance network 78, 79, 80 represents an attenuator. For adaptation the input impedance of the input network 73, 74, 75 and the input and output impedance of the output network 78, 79, 80 must have a value of 50 Ohms.

Figure 12:
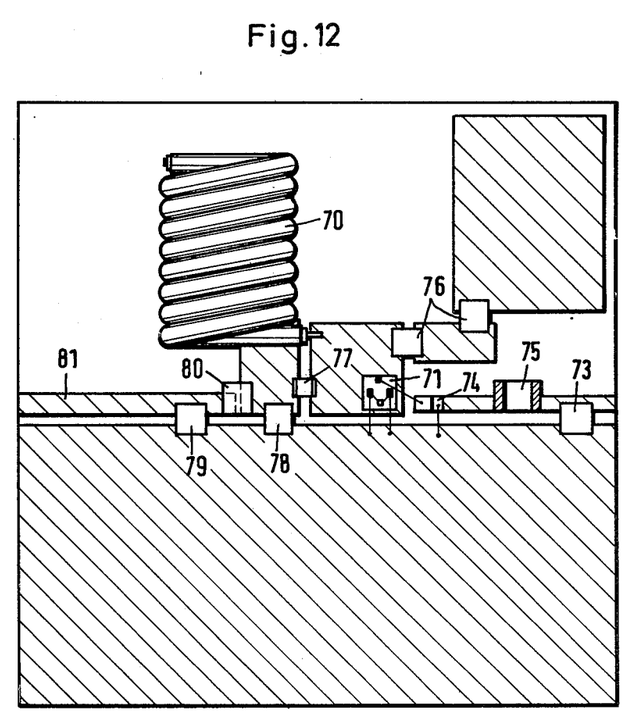
FIG. 12 is a practical embodiment of the pulse generating stage of FIG. 11 in the form of an integrated hybrid circuit.

FIG. 12 shows a practical embodiment of the avalanche pulse generator of FIG. 11 in the form of an integrated hybrid circuit, corresponding components being denoted by the same reference numerals. To save space the charging line 70 is coiled helically.

FIGS. 14 and 15 show a practical embodiment of the photo detector 14 and the immediately following sampling circuit 22 of the time transformation stage ZT in the form of an integrated hybrid circuit. FIG. 13 shows diagrammatically the equivalent circuit diagram of this arrangement. The photo diode 82 is biased via two resistors 83, 84 by a DC voltage $U_1$ in the reverse direction and decoupled by a capacitor 85 for direct current with respect to ground. For fast pulses the capacitor 85 represents a short circuit. The resistor 86 represents the output resistance of the photo detector via which the photo diode 82 is connected to the sampling circuit 22. The sampling circuit is made as sampling bridge comprising a microstrip line 92 with nonreflection termination by a resistor 87 and a slit line 95 running parallel thereto. The sampling bridge includes two diodes 88, 89 which are biased by a DC voltage $U_2$ in the reverse direction and two capacitors 90 and 91. The diode 88 and the capacitor 90 are in series between the microstrip line 92 and the one side 93 of the slit line 95 and the diode 89 and the capacitor 91 are in series between the microstrip line 92 and the other side 94 of the slit line 95.

When an echo pulse reflected at the target strikes the photo diode 82 the latter sends a corresponding electrical pulse via the sampling bridge. To sample this electrical pulse the diodes 88, 89 are briefly opened by push-pull sampling pulses $I_{41}$, $I_{42}$ produced by the aid of the slit line 95. Depending on the polarity of the measuring signal a sampling value is stored at the capacitor 90 or the capacitor 91.

FIG. 14 shows the top and FIG. 15 the bottom of the substrate of the hybrid circuit.

In this embodiment the push-pull sampling pulses $I_{41}$ and $I_{42}$ are produced by a short-circuited slit line as described by J. Merkeilo and R. D. Hall in the journal "IEEE-Journal of Solid-State Circuits SC-7" (1972), pages 50 to 54.

FIG. 14 shows the photo diode 82 which is connected to the microstrip line 92 with reflection-free termination by the resistor 87, the electrical pulse to be sampled running via said line. The resistors 83, 84 and the capacitor 85 of the photo detector are formed as components of the integrated hybrid circuit. In this manner the photo detector is combined directly with the time transformation stage, avoiding the coupling in of interference signals. The slit line 95 runs parallel beneath the signal line 92 on the other side of the substrate of the integrated circuit. For clarity, FIG. 15 shows only the centre portion and the two end portions of the slit 95 to a larger scale. The diodes 88, 89 are of the beam-lead type and disposed in the slit 95. They are connected on the one hand by a metallic passage 96 to the microstrip line 92 and on the other by bond wires to the capacitors 90, 91 of the thin-film type. The connection points between the diodes 88, 89 and the capacitors 90, 91 are connected via further metallic passages 97, 98 and via high-value resistors 99, 100 disposed on the top of the substrate (FIG. 14) to coaxial outputs 101, 102 via which the signal across the capacitors is transmitted to an amplifier of high input impedance.

For each sampling operation an avalance pulse generator having for example the form illustrated in FIGS. 11 and 12 applies a negative voltage jump to a microstrip line 103 (FIG. 15) which is disposed on the lower side of the substrate and intersects the pulse-shaping strip 95 at the level of the diodes 98, 99 and has a non-reflection termination by a resistor 104. The slit 95 is bridged by a metallic strip 105. It is known that because of its field configuration the energisation of the slit line is optimum if said line extends perpendicularly to the propagation direction of the quasi-TEM wave on the microstrip line. The length of the voltage pulses stimulated via the slit is defined by the length of the slit line. With the illustrated arrangement of the microstrip line 92 the slit line 95 and the microstrip line 103 the sample impulses and the measuring pulse to be sampled and the reference pulse are decoupled from each other.

We claim:

1. Distance measuring apparatus based on the pulse travel time method comprising a light pulse generator for generating periodic light pulses, a transmitting optical system for transmitting the light pulses, a receiving optical system for receiving the echo pulses produced by reflection of the light pulses at a target object, a photoelectric transducer for converting each echo pulse to an electrical measuring pulse, means for generating electrical reference pulses in predetermined time relationship to the transmitted light pulses, a time transformation stage operating by the sampling method and comprising a sampling pulse generator for generating periodic sampling pulses whose period is slightly different to the period of the transmitted light pulses, a first sampling circuit receiving said sampling pulses and said reference pulses and producing time-transformed reference pulses by periodically sampling a large number of successive reference pulses by means of said sampling pulses, and a second sampling circuit receiving said sampling pulses and said measuring pulses and producing time-transformed measuring pulses by periodically sampling a large number of successive measuring pulses by means of said sampling pulses, said second sampling circuit being directly connected to the output of said photoelectric transducer to receive said measuring pulses without intervening amplification, and time measuring means for measuring the time interval between corresponding edges of each time-transformed reference pulse and an associated time-transformed measuring pulse.

2. Distance measuring apparatus according to claim 1, characterized in that each sampling circuit is constructed as sampling bridge which is controlled by narrow push-pull sampling pulses.

3. Distance measuring apparatus according to claim 2, characterized in that the sampling bridge is constructed as integrated hybrid circuit.

4. Distance measuring apparatus according to claim 3, characterized in that the integrated hybrid circuit includes a first microstrip line with reflection-free termination via which the pulses to be sampled are transmitted, that a shortcircuited slit line runs parallel to the microstrip line, that a second microstrip line with reflection-free termination intersects the slit line, via which second microstrip line for generating the narrow push-pull sampling pulses the sampling pulses of one polarity supplied by the sampling pulse generator are transmitted, that at the intersection in the slit two reversed-biased diodes are disposed which are connected counter-poled between the first microstrip line and a capacitor in each case, whose other electrode is connected to the ground conductor on the one side and on the other side of the slit, and that the connection points between the diodes and the capacitors are each connectedto an output conductor for withdrawing the signal occurring at the capacitor.

5. Distance measuring apparatus according to claim 3 or 4, characterized in that the photoelectric transducer comprises a photodiode which is mounted directly at the integrated hybrid circuit.

6. Distance measuring apparatus according to claim 5, characterized in that the circuit components of the photoelectric transducer necessary for biasing the photodiode are formed as constituents of the integrated hybrid circuit.

7. Distance measuring apparatus according to claim 1, characterized in that the sampling pulse generator includes at least one pulse generating stage formed as avalanche pulse generator with an avalanche transistor and a charging line.

8. Distance measuring apparatus according to claim 7, characterized in that the sampling pulse generator includes a separate pulse generating stage for each sampling circuit.

9. Distance measuring apparatus according to claim 7 or 8, characterized in that each avalanche pulse generator is formed as integrated hybrid circuit and that the charging line is formed by a strip line.

10. Distance measuring apparatus according to claim 9, characterized in that the strip line is coiled.

11. Distance measuring apparatus according to claim 1, characterized in that the light pulse generator operates intermittently in working cycles interrupted by rest intervals.

12. Distance measuring apparatus according to claim 7, characterized in that the duration of each working cycle is substantially equal to the duration of a sampling cycle of the sampling method.

13. Distance measuring apparatus according to claim 1, characterized in that the light pulse generator includes an avalanche pulse generator having an avalanche transistor and a charging line.

14. Distance measuring apparatus according to claim 13, characterized in that the base of the avalanche transistor is negatively biased.

15. Distance measuring apparatus according to claim 13 or 14, characterized in that the avalanche pulse generator is formed as integrated hybrid circuit and that the charging line is formed by a strip line.

16. Distance measuring apparatus according to claim 15, characterized in that the strip line is coiled.

17. Distance measuring apparatus according to claim 13, characterized in that a laser diode is disposed in the emitter circuit of the avalanche transistor.

18. Distance measuring apparatus according to claim 13, characterized by a pulse shaper stage connected to a the avalanche pulse generator for producing the reference pulses.

19. Distance measuring apparatus according to claim 18, characterized in that the pulse shaper stage is formed by a damped parallel resonant circuit connected in parallel with the laser diode.

20. Distance measuring apparatus according to claim 13, characterized in that the light pulse generator includes a trigger pulse generator which produces trigger pulses for triggering the avalanche pulse generator.

* * * * *